March 13, 1934.    V. BUXTON    1,950,969
MACHINE FOR STROPPING RAZOR BLADES
Filed April 16, 1929    2 Sheets-Sheet 1
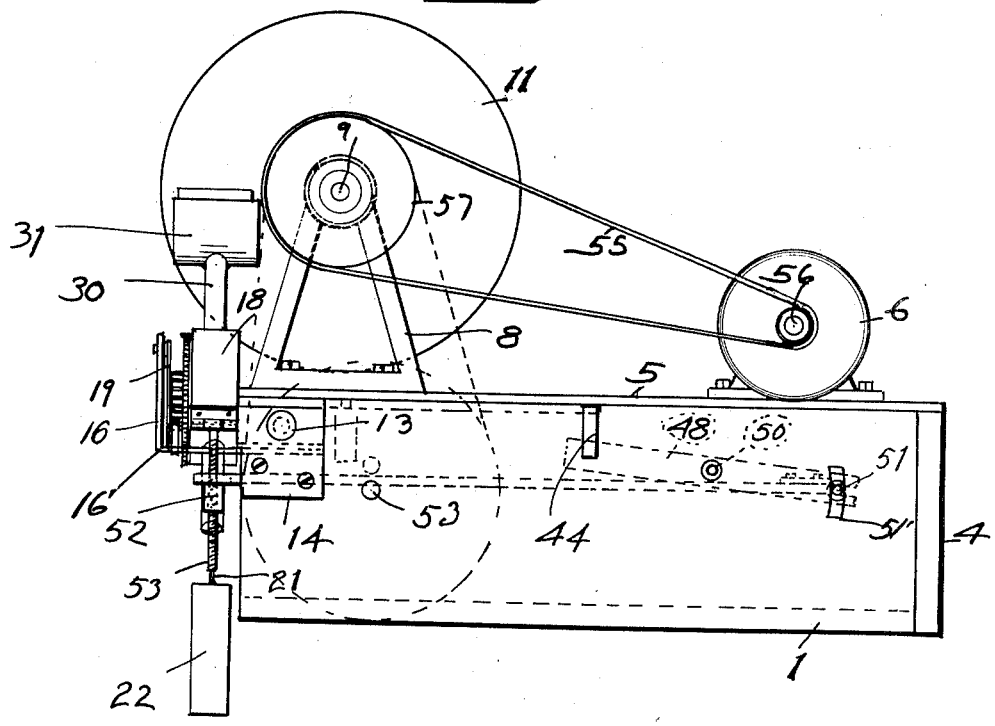
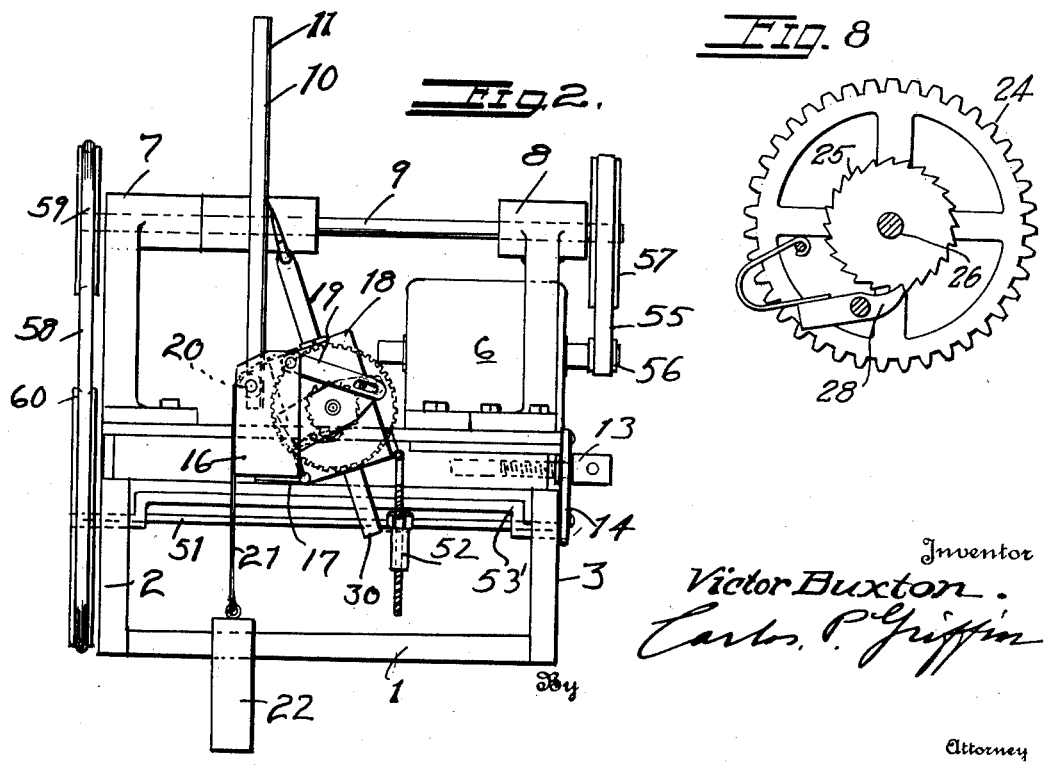

March 13, 1934.  V. BUXTON  1,950,969
MACHINE FOR STROPPING RAZOR BLADES
Filed April 16, 1929  2 Sheets-Sheet 2
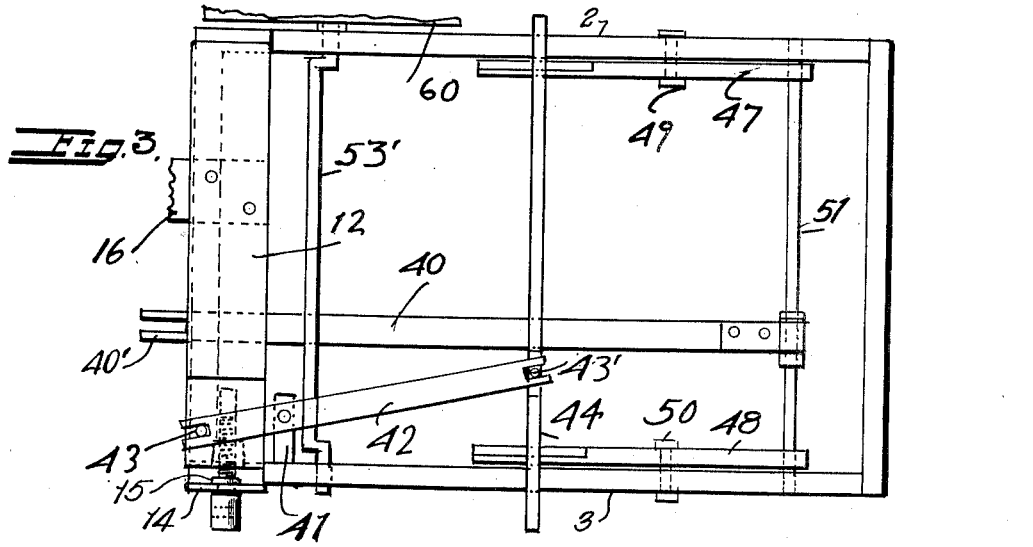
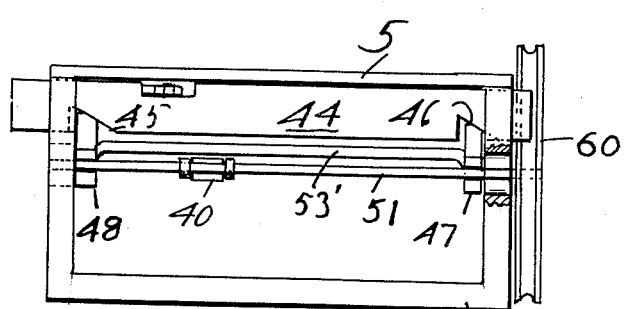
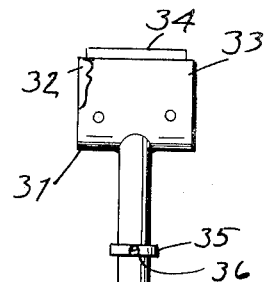
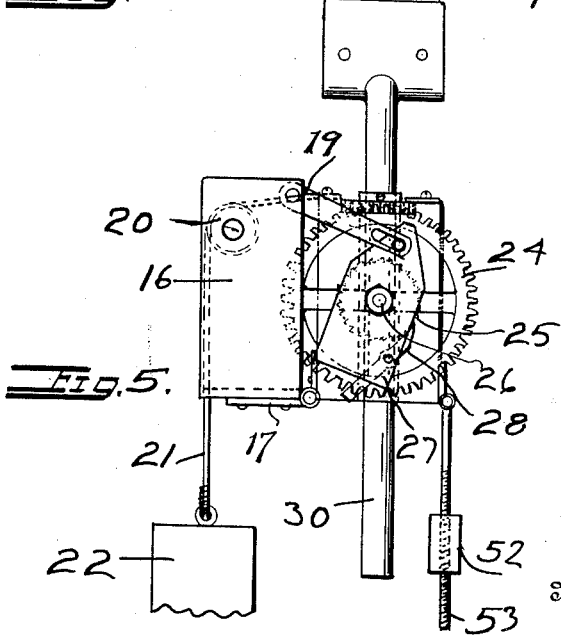
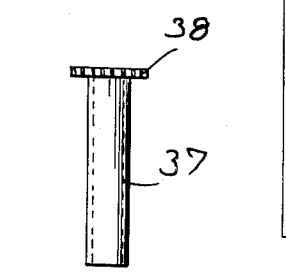
Inventor
Victor Buxton.
By Carlos P. Griffin
Attorney Patented Mar. 13, 1934

1,950,969

UNITED STATES PATENT OFFICE 1,950,969

MACHINE FOR STROPPING RAZOR BLADES

Victor Buxton, Eureka, Calif.

Application April 16, 1929, Serial No. 355,478

2 Claims. (Cl. 51—124)

This invention relates to machines for stropping razor blades and more particularly to a machine in which the blades are stropped on each side by a reversal of position.

The principal object of the invention is to provide a machine which will accurately sharpen the edges of all types of razor blades that may be stropped thereon.

Another object is to provide a detachable holder for the blades. The blade to be sharpened is placed in this detachable holder and then honed manually. The holder with the honed blade therein is then inserted in the stropping machine and stropped automatically until a sharp edge is attained.

Another object is to provide a swivel mounting for the razor blade so that the blade may be automatically trued each time it strikes the stropping member.

A further object is to provide means whereby the machine may be adjusted to strop blades that have varying bevels.

A further object is to provide a uniform pressure for the blade against the stropping member.

Other objects and advantages will appear as the description progresses.

The invention is herein disclosed in a form adapted for commercial use. In the drawings and the specification only one stropping member and blade holder is shown, but it is to be understood that a plurality of stropping members and blade holders may be mounted side by side on the same machine.

The invention is shown in its preferred form, but it is to be understood that it is not limited to this form because it may be embodied in other forms. It is also to be understood that in and by the claims following the description it is desired to cover the invention in whatsoever form it is embodied.

In the accompanying two sheets of drawings:

Fig. 1 is a side elevation of a machine constructed in accordance with this invention.

Fig. 2 is a front elevation of the same.

Fig. 3 is a plan view of the machine broken away in part to show the operating mechanism.

Fig. 4 is a rear elevation of the mechanism shown in Fig. 3.

Fig. 5 is an enlarged detail in front elevation of the mechanism for reversing the position of the blade.

Fig. 6 is a side elevation of the carrier in which the blade holder is placed.

Fig. 7 is a side elevation of the blade holder.

Fig. 8 is an enlarged section view of the controlling ratchet of the blade reversing mechanism.

The machine is mounted on the base 1, having the upwardly extending sides 2—3 which are joined by the back 4 and the top 5. The motor 6 is mounted on the top 5 and is provided with the pulley 56. The belt 55 is driven by the pulley 56 and engages the pulley 57 which is mounted on the end of the shaft 9.

The shaft 9 is journaled in the bearings 7—8 provided in the standards 7'—8' which are mounted on the top 5. The wheel 10 is mounted on the shaft 9 and is faced on its radial side with the leather 11. The leather is surfaced with a suitable stropping compound and furnishes the stropping surface for the blades.

One side of the razor blade is held against the strop 11 and its position is periodically reversed by the following mechanism: The blade shown at 34 is frictionally clamped in the holder 31. The holder is formed into a U, the upper lips 32—33 of which are pried apart by the insertion of the blade. The advantage of the frictional engagement of the blade is that any wafer type of razor blade may be inserted in the holder. The holder 31 is provided with the handle 30 upon which is mounted the collar 35, the position of which may be adjusted by loosening the set-screw 36. Before the holder 31 is inserted in the machine, the blade may be manually honed on a suitable stone.

The blade reversing mechanism is mounted on the bracket 16 which is rigid with the slide 12 which extends between the sides 2—3. The bracket 16 is bent upward at 16'. The hinge 17 is mounted adjacent to this bent 16' and pivots the block 18. The tube 37 is rotatably mounted within the block 18 and has the pinion 38 fixed to its upper end. The handle 30 of the holder 31 is inserted in the tube 37 and retained in position by the collar 35.

The pinion 38 is enmeshed with the large spur gear 24 which is rotatably mounted on the shaft 26 which is fixed to the block 18. The ratchet wheel 25 is also mounted on the shaft 26 and is secured to the gear 24. The pawl 28 engages the teeth of the ratchet wheel 25 and is pivoted to the plate 27. The pawl 28 is held in operative position by a suitable light spring which is secured to the plate 27. The plate 27 is rotatably mounted on the shaft 28 and a suitable nut on the end of the shaft prevents lateral movement.

A pin is mounted on the upper portion of the plate 27 and works in a slot provided in the arm 19 which is pivoted on the bracket 16.

A cord 21 is connected to the upper portion of the block 18 and passes over the pulley 20 which is pinned to the bracket 16. The weight 22 is connected to the end of the cord 21 and inclines the block 18 so that the blade 34 contacts the strop 11. The contact of the blade against the strop is therefore always of a uniform pressure as the pull of the weight is constant.

The rod 53 is pivoted to and depends from, the block 18. The lower end of the rod 53 is threaded and engages a nut 52 which is adjustable on the rod. The lever 40 is pivoted on the rod 51, the position of which is adjustable, as hereinafter described. The bifurcated end 40' of the lever 40 straddles the rod 53 and works against the nut 52.

The crankshaft 53' is journaled in the sides 2—3 and passes above the lever 40. The pulley 60 is mounted on the end of the crankshaft 53' and is driven by the belt 58. The pulley 59 engages the belt 58 and is mounted on the motor-driven shaft 9.

The operation of the machine is substantially as follows:

The shaft 9 and the strop wheel 10 are driven by the motor 6 through the belt 55. The rotation of the shaft 9 is transmitted to the crankshaft 53' by the belt 58. Each rotation of the crankshaft 53' depresses the lever 40 through the cam motion of the crank.

The depression of the lever 40 lowers the rod 53 a distance which may be adjusted by the nut 52. This causes the block 18 to be swung on the hinge 19 and to remove the razor blade 34 from the rotating strop 11. The gear 24 and the plate 27 follow the movement of the block 18 until the pin on the plate 27 arrives at the end of the slot in the arm 19. The blade 34 is moved a sufficient distance from the strop 11 during the movement of the pin in the slot in arm 19 to permit rotary movement independent of the strop.

When the pin-and-slot movement is completed, the plate 27 is held stationary. The pawl 28 engages the ratchet wheel 25 and stops the movement of the gear 24. The movement of the block 18, however, continues and rotates the pinion 38 against the stationary gear 24. The rotation of the pinion 38 moves the holder 31 and the blade 34 approximately one-half a revolution.

When the crankshaft 53' releases the lever 40, the block 18 is swung back to its original position and the blade 34 resumes contact with the strop 11. The power for this restoration movement is furnished by the gravity of the weight 22. The blade 34 makes no further movement upon the restoration movement as the teeth of the ratchet wheel 26 are non-operative in this direction. Any minor misalignment of the blade 34 with respect to the strop 11 is rectified when the blade contacts the strop. The handle 30 of the holder 31 is loosely swiveled in the tube 37 so that a slight independent rotation of the blade is automatically accomplished.

The angle of contact of the blade with the strop may be varied to correspond with the bevel of the sharp edge of the blade.

The adjusting screw 13 is held in a fixed lateral position by the plate 14 which works against the collar 15. The threaded portion of the screw 13 engages the slide 12. Any rotation of the screw 13 thereby adjusts the lateral position of the slide 12.

This moves the bracket 16 and the block 18 nearer or farther away from the strop 11 to change the angle of contact of the blade and the strop.

As this adjustment causes a difference in the rotation of the blade, it is necessary to alter the throw of the operating lever 40. The following mechanism is provided for this purpose.

The lever 42 is pivoted on the bracket 41 which extends from the side 3. The forward end of this lever is slotted and engages the pin 43 which is mounted on the slide 12. The other end of lever 42 is also slotted and engages the pin 43' on the transverse rod 44. Any lateral adjustment of slide 12 by the screw 13 swings the lever 42 and moves the rod 44.

The underside of the rod 44 is notched to form the inclined cam surfaces 45—46. These cam surfaces work on the levers 47—48, which are pivoted at 49—50 to the sides 2—3. The rearward ends of the levers 47—48 are slotted and engage the rod 51 which works in the slots 51' in the sides 2—3. The rod 51 forms the pivot of the lever 40.

Lateral movement of the rod 44 swings the levers 47—48 by contact with the cam surfaces 45—46. This moves the rod 51 in the slots 51' which raises or lowers the lever 40 in respect to the crankshaft 53'. When the position of the lever 40 is altered, its throw is also changed, as the contacting of the crankshaft 53' is advanced or retarded.

Having thus described my invention, what I desire to secure by Letters Patent of the United States is as follows, but modifications may be made in carrying out the invention as shown in the drawings and in the above particularly described form thereof, within the purview of the annexed claims.

1. A machine for stropping razor blades comprising a rotatable stropping member, a holder adapted to contain a razor blade, a block adapted to detachably engage said holder, a calibrated weight cooperating with said block to hold said razor blade in contact with said stropping member, a driving member engaging said block and adapted to periodically swing said block to remove the razor blade from contact with said stropping member, a gear adapted to be held stationary while said razor blade is thus removed from the stropping member to rotate said holder, a slide mounting said block, means to vary the lateral position of said slide and block with respect to said stropping member to vary the angle of contact of the razor blade with said stropping member, a member connected to said adjustable slide for regulating the distance of throw of said driving member according to the lateral position of said block.

2. A machine for stropping razor blades comprising a frame, a rotatable stropping member mounted on said frame, a slide on said frame, a block pivoted on said slide, a razor blade holder detachably mounted in said block, a calibrated weight cooperating with said block to hold the razor blade in said holder in contact with said stropping member, a driving member adapted to periodically remove the razor blade from contact with said stropping member, means for reversing the position of the razor blade when the blade is removed from contact with said stropping member, and means to vary the lateral position of said slide and block with respect to said stropping member.

VICTOR BUXTON.